United States Patent
Menzel

(10) Patent No.: US 8,617,423 B2
(45) Date of Patent: Dec. 31, 2013

(54) SYNGAS PRODUCTION METHOD

(75) Inventor: Johannes Menzel, Waltrop (DE)

(73) Assignee: Thyssenkrupp Uhde GmbH, Dortmund (DE)

( * ) Notice: Subject to any disclaimer, the term of this patent is extended or adjusted under 35 U.S.C. 154(b) by 0 days.

(21) Appl. No.: 13/319,571

(22) PCT Filed: May 6, 2010

(86) PCT No.: PCT/EP2010/056154
§ 371 (c)(1),
(2), (4) Date: Dec. 2, 2011

(87) PCT Pub. No.: WO2010/136313
PCT Pub. Date: Feb. 12, 2010

(65) Prior Publication Data
US 2012/0068120 A1 Mar. 22, 2012

(30) Foreign Application Priority Data

May 25, 2009 (DE) .......................... 10 2009 022 509

(51) Int. Cl.
*C01B 3/38* (2006.01)
*C01B 3/24* (2006.01)
(52) U.S. Cl.
USPC .......................................... 252/373; 423/650
(58) Field of Classification Search
USPC ....................................................... 252/373
See application file for complete search history.

(56) References Cited

U.S. PATENT DOCUMENTS

| 4,013,454 | A | 3/1977 | Jordan |
| 4,889,323 | A | 12/1989 | Pusch |
| 6,986,800 | B2 | 1/2006 | Duarte-Escareno |
| 2004/0247499 | A1 * | 12/2004 | Matsuoka et al. ............ 422/191 |

FOREIGN PATENT DOCUMENTS

| CN | 1803746 | 7/2006 |
| EP | 0200880 A | 12/1986 |
| JP | 57122025 A | 7/1982 |

OTHER PUBLICATIONS

Espacenet machine translation of Chinese document CN1803746, pp. 1-3.*

* cited by examiner

*Primary Examiner* — Melvin C Mayes
*Assistant Examiner* — Kenneth Vaden
(74) *Attorney, Agent, or Firm* — Jonathan Myers; Andrew Wilford

(57) ABSTRACT

An $H_2$- and CO-containing synthesis gas is made by separating coke-oven gas from a coke-oven process into hydrogen and a residual gas stream containing hydrocarbons and obtaining a CO-rich synthesis-gas stream from a top gas of a blast furnace. The hydrogen separated from the coke-oven gas is fed into the CO-rich synthesis gas stream obtained from the top gas of a blast furnace to make the synthesis gas, and the hydrocarbon-containing residual gas stream is fed into the blast furnace as feedstock.

6 Claims, No Drawings

SYNGAS PRODUCTION METHOD

CROSS-REFERENCE TO RELATED APPLICATIONS

This application is the US-national stage of PCT application PCT/EP2010/056154 filed 6 May 2010, published 2 Dec. 2010 as WO2010/135313, and claiming the priority of German patent application 102009022509.9 itself filed 25 May 2009, whose entire disclosures are herewith incorporated by reference.

FIELD OF THE INVENTION

The invention relates to a method of making a synthesis gas containing $H_2$ and CO.

BACKGROUND OF THE INVENTION

Synthesis gases are gas mixtures that are used in synthesis reactions and consist primarily of carbon monoxide and hydrogen. For some $CO/H_2$ combinations, special names have established themselves, such as water gas, cracked gas, methanol synthesis gas or oxogas, because of their origin or use. Synthesis gas can be used as a starting mixture for the production of liquid fuels. Thus, synthesis gas is used, for example, in the Fischer-Tropsch process for generating diesel fuel. Gasoline fuels can be produced according to the MTG process (methanol to gasoline), in which synthesis gas is first converted to methanol, which is converted to gasoline in additional processing steps.

In principle, all substances containing carbon can be used for the production of synthesis gas. These include the fossil fuels—coal, crude oil and natural gas—as well as additional feedstocks such as, for example, plastic, peat, wood or other biomass such as municipal or agricultural waste. If solid matter is used, it must first be expensively reduced to small pieces, so that by partial oxidation or dissociation of steam, a raw synthesis gas can be generated. The raw synthesis gas is subsequently processed in additional steps. All of these steps lead to high investment costs, which are an obstacle for the production of fluid fuels from synthesis gas.

From EP 0 200 880 A2 it is known to mix converter gas with a high CO content from a blast furnace and coke-oven gas having a high hydrogen content and to use it as synthesis gas for methanol synthesis. In the known method, the coke-oven gas is first fed into a pressure swing adsorption system in which approximately 83% of the hydrogen contained in the coke-oven gas is separated. The residual hydrocarbon-containing gas is compressed, freed of catalyst poisons in a purification step, then converted and split in a steam reformer with the aid of water vapor into CO, $CO_2$ and $H_2$. The cracked gas is mixed with the previously separated hydrogen and mixed with enough converter to make a stoichiometric synthesis gas, and used as a methanol synthesis gas. Additional systems are required for the processing the coke-oven gas that was described, which are associated with corresponding investment and operating costs.

OBJECT OF THE INVENTION

It is the object of the present invention to reduce the expense of the technical systems and also the operating costs of producing synthesis gas.

SUMMARY OF THE INVENTION

The subject matter of the invention and the solution to this problem is a method of making a synthesis gas containing $H_2$ and CO. According to the invention, coke-oven gas from a coke-oven process is separated into hydrogen and a hydrocarbon-containing residual gas stream. The hydrogen separated from the coke-oven gas is fed to a CO-rich synthesis gas stream obtained from the top gas of a blast furnace process, and the residual gas stream containing the hydrocarbons is fed into the blast furnace as feedstock.

The residual gas stream that is recycled into the blast furnace is rich in methane and CO. The hydrocarbons are used as fuels in the blast furnace. The CO component fed into the blast furnace with the residual gas leads to an increase of the top gas drawn off from the blast furnace, which is used to make synthesis gas.

The method according to the invention is energy-efficient and does not require any additional processing steps or systems.

Coal is fed into the coke oven that is heated anaerobically to more than 1000° C. This way, the volatile components of the coal are driven out. They form the coke-oven gas. If several coke ovens are used, the raw gases created are combined via a manifold. The coke-oven gas is removed and desulfurized prior to further use, i.e. prior to being split into is hydrogen and a residual gas stream containing the hydrocarbons, and is also freed of ammonia, aromatic compounds, and naphthalene. The purified coke gas (coal gas) is preferably fed into a pressure swing adsorption system (PSA system) in which the hydrogen is separated from the residual gas. The pressure swing adsorption system can also be designed as a vacuum PSA system (VPSA). On the pressure side of the adsorption system, pure hydrogen is obtained. Decompression decreases the residual gas that contains methane and carbon monoxide and that is fed into the blast furnace as feedstock.

The blast furnace process is equipped for synthesis-gas production. The blast furnace is charged with iron ore and carbon-containing reduction agents, so the amount of carbon-containing reduction agents used in the blast furnace process is larger than the amount of fuel needed to make iron. Further, technically pure oxygen is fed to the blast furnace for obtaining iron and for producing a CO-rich synthesis gas that is drawn off as top gas. In addition $CO_2$ and/or water vapor can be added to the blast furnace to control the $CO/H_2$ ratio of the top gas leaving the blast furnace, so the following reactions can take place:

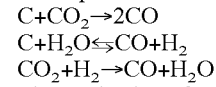

The production of synthesis gas according to the invention by combining coke-oven gas and top gas from a blast furnace makes advantageous use of the generation of hydrogen-rich raw gas in the coke oven and carbon monoxide-rich raw gas in the blast furnace. In addition, coke ovens are, as a rule, located in the vicinity of blast furnaces, as coke is required for the blast furnace process. The production of synthesis gas from coke-oven gas and the top gas from a blast furnace process make a targeted substance utilization of the gaseous byproducts of coke production and iron ore production possible.

The invention claimed is:
1. A method of making an $H_2$- and CO-containing synthesis gas, the method comprising the steps of:
 (a) separating coke-oven gas from a coke-oven process into hydrogen and a residual gas stream containing hydrocarbons and CO,
 (b) obtaining charging a blast furnace with iron ore, oxygen, fuel and a carbon-containing reduction agent to process iron ore into iron, feeding $CO_2$ into the blast furnace to control a $CO/H_2$ ratio of a top gas formed in the blast furnace thereby forming a CO-rich synthesis gas stream and drawing off the CO-rich synthesis-gas stream from the top gas of the blast furnace, (c) feeding the hydrogen separated from the coke-oven gas according to step (a) into the CO-rich synthesis gas stream drawn off from the top gas of the blast furnace according to step (b) to make the synthesis gas, and (d) feeding the residual gas stream containing hydrocarbons and CO separated from the coke oven gas according to step (a) into the blast furnace where the hydrocarbons serve as feedstock and the CO leads to an increase in the CO-rich synthesis gas stream drawn off from top gas from the blast furnace according to step (b), which is used to make the synthesis gas.

2. The method according to claim 1, further comprising the step of removing and desulfurizing the coke-oven gas prior to separating it into hydrogen and a residual gas stream containing hydrocarbons and CO according to step (a), and freeing it of ammonia, aromatic compounds and naphthalene.

3. The method according to claim 1, wherein according to step (a) the coke-oven gas is separated into hydrogen and a residual gas stream containing hydrocarbons and CO by feeding the coke-oven gas into a pressure swing adsorption system that separates the coke-oven gas into a stream of hydrogen and a residual gas stream containing the hydrocarbons and CO.

4. The method according to claim 3, wherein according to step (b) the amount of carbon-containing reduction agents used in the blast furnace process is larger than the amount of fuel required to process the iron ore into iron.

5. The method according to claim 1, wherein according to step (b) the blast furnace process takes place in a blast furnace into which technically pure oxygen is fed for iron production and for generating the top gas from which is drawn off the CO-rich synthesis gas.

6. A method of making an $H_2$- and CO-containing synthesis gas, the method comprising the steps of:

(a) separating coke-oven gas from a coke-oven process into hydrogen and a residual gas stream containing hydrocarbons and CO, (b) charging a blast furnace with iron ore, oxygen, fuel and a carbon-containing reduction agent to process iron ore into iron, feeding $CO_2$ into the blast furnace to increase formation of CO and drawing off a CO-rich synthesis-gas stream from a top gas of the blast furnace, (c) feeding the hydrogen separated from the coke-oven gas according to step (a) into the CO-rich synthesis gas stream drawn off from the top gas of a blast furnace according to step (b) to make the synthesis gas, and (d) feeding the residual gas stream containing hydrocarbons and CO separated from the coke oven gas according to step (a) into the blast furnace where the hydrocarbons serve as feedstock and the CO leads to an increase in the top gas drawn off from the blast furnace according to step (b), which is used to make the synthesis gas.

* * * * *